United States Patent [19]

Toriu et al.

[11] Patent Number: 4,837,922
[45] Date of Patent: Jun. 13, 1989

[54] PROCESS FOR MANUFACTURING A COMPOSITE MAGNETIC HEAD STRUCTURE

[75] Inventors: Jirou Toriu; Katsuhiro Ohno, both of Amagasaki; Jun Miyajima, Koriyama, all of Japan

[73] Assignee: Mitsubishi Denki Kabushiki Kaisha, Japan

[21] Appl. No.: 213,465

[22] Filed: Jun. 27, 1988

Related U.S. Application Data

[62] Division of Ser. No. 824,324, Jan. 30, 1986, abandoned.

[30] Foreign Application Priority Data

Jan. 30, 1985 [JP] Japan .................................. 60-15831
May 8, 1985 [JP] Japan .................................. 60-97006

[51] Int. Cl.$^4$ .............................................. G11B 5/42
[52] U.S. Cl. ..................................... 29/603; 360/121; 360/127
[58] Field of Search .................. 29/603; 360/121, 122, 360/125, 127

[56] References Cited

U.S. PATENT DOCUMENTS 4,188,247  2/1980  Ridgway et al. ............... 360/126 X
4,611,259  9/1986  Schiller ............................. 29/603 X
4,711,018  12/1987  Matsuzawa ......................... 29/603

*Primary Examiner*—Carl E. Hall
*Attorney, Agent, or Firm*—Sughrue, Mion, Zinn, Macpeak & Seas

[57] ABSTRACT

A composite magnetic head tip has a pair of head cores (2,3) facing each other and each having a center core (5,7) and a side core (4,6) which are separated by a magnetic gap (8,9) and are glass welded together at an apex portion (32). Each head core has a set of notches (14,14') which define a track width in the magnetic gap. Each notch is formed so that it begins at a confronting surface (29) where the center cores face each other, crosses through the magnetic gap, and ends on a sliding surface (28) for slidably contacting a magnetic medium. The notches end at a point which is directly above the welded position (19) provided at the apex portion of each head core. A process for manufacturing the composite magnetic head tip includes the steps of first forming a head core and then forming a set of notches therein, then forming another head core and forming another set of notches therein, aligning track widths and then glass molding each of the head cores together while at the same time filling the track notches with the same glass molding. An alternative process involves forming the notches in the head core blocks such that the lower surface (31) of the notches passes below the apex portion of the head core blocks, and applying glass molding to the notches and between the two head cores using a glass material that has a melting point substantially as low as the melting point of the glass material used for glass welding the side and center cores.

7 Claims, 6 Drawing Sheets

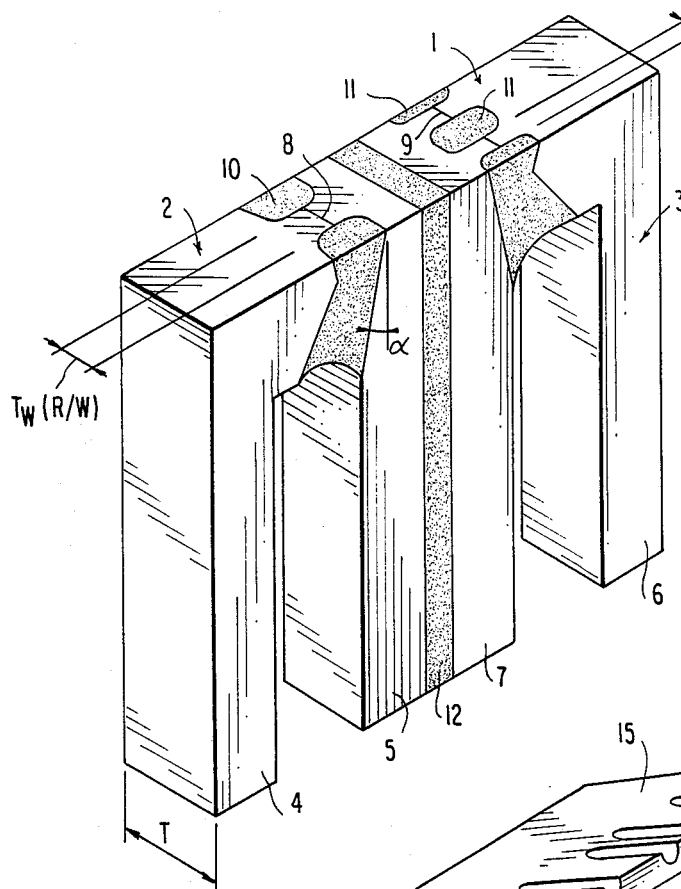
FIG. 1
PRIOR ART
$T_W(R/W)$: TRACK WIDTH OF W/R CORE
$T_W(E)$ : TRACK WIDTH OF E CORE
$T$ : DEPTH OF HEAD TIP
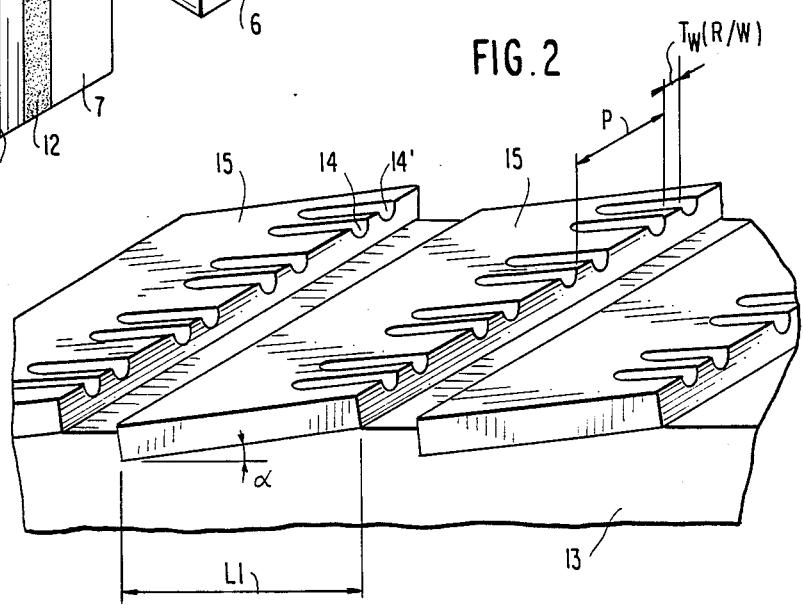
FIG. 2
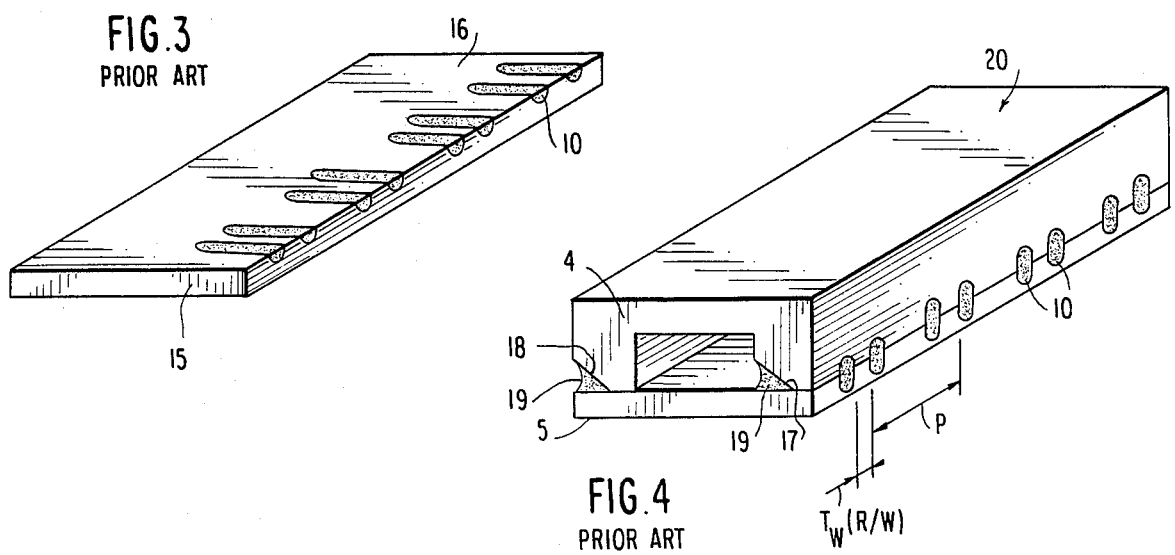
FIG. 3
PRIOR ART
FIG. 4
PRIOR ART

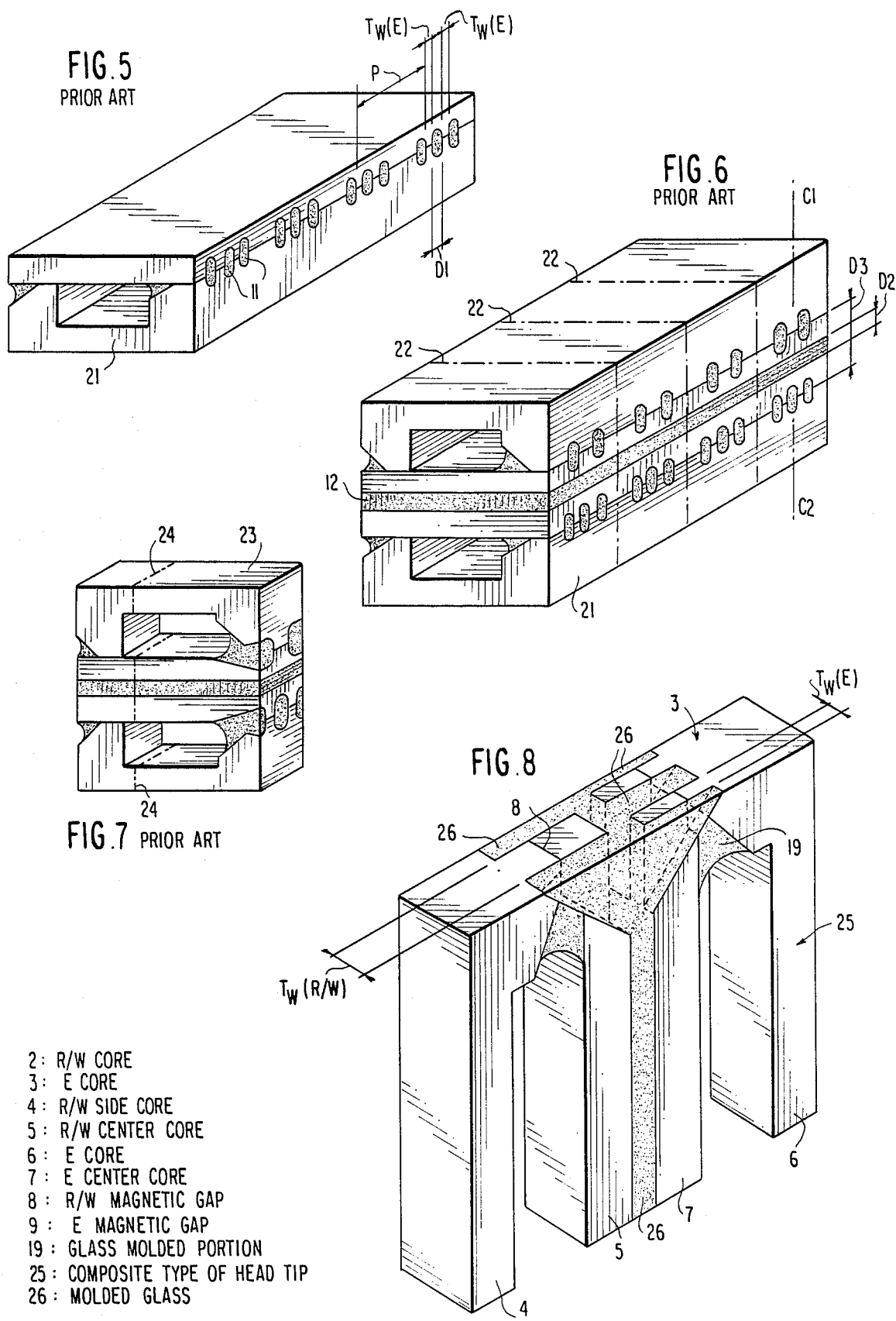

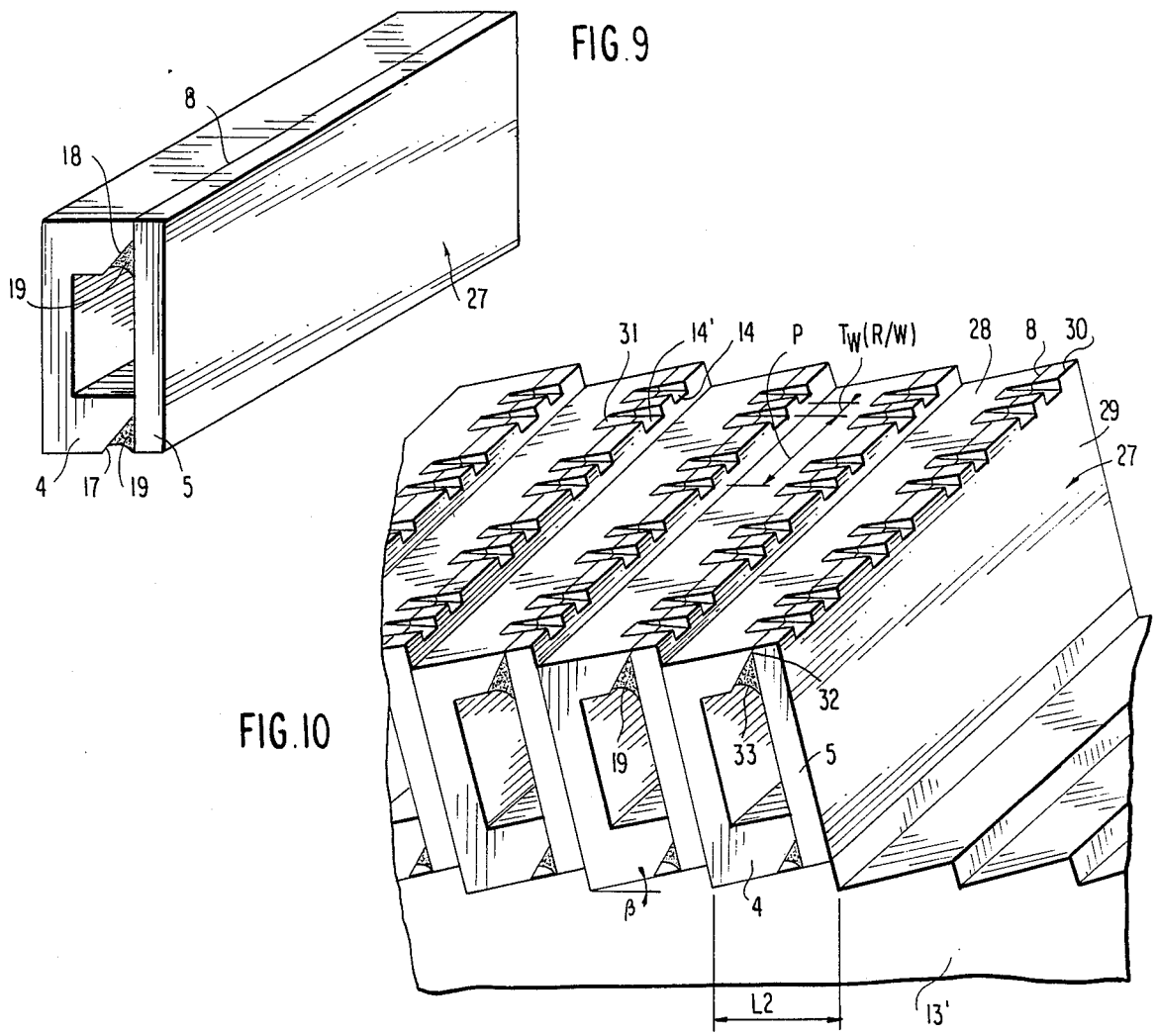
FIG. 9
FIG. 10
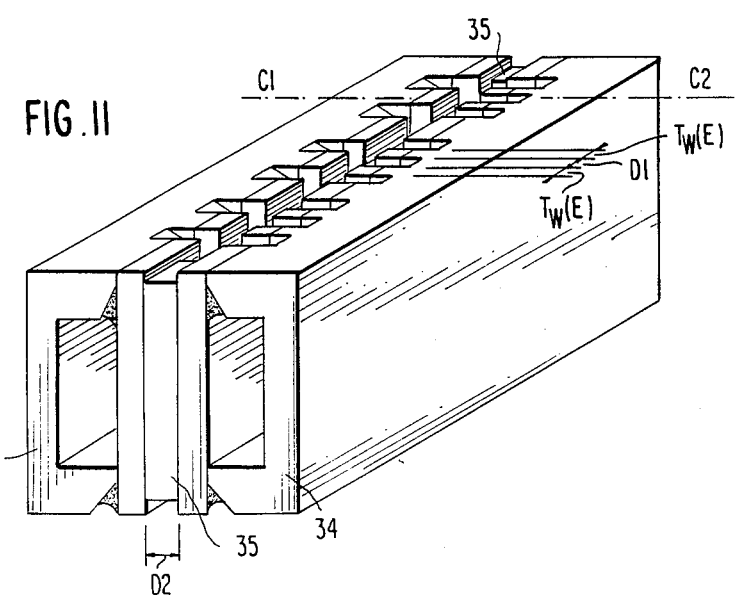
FIG. 11

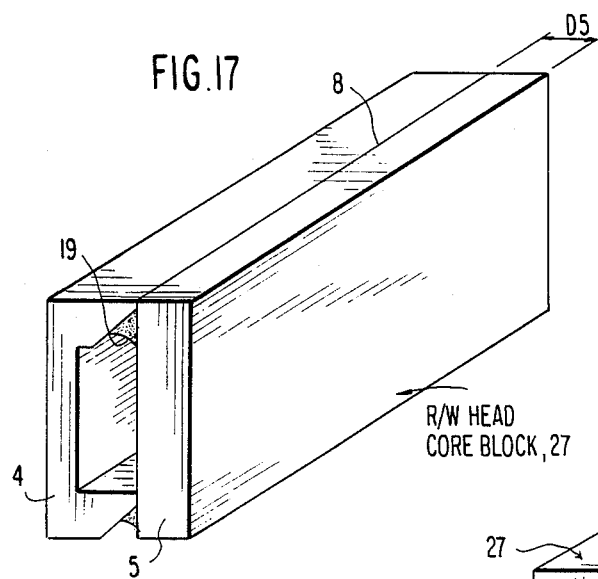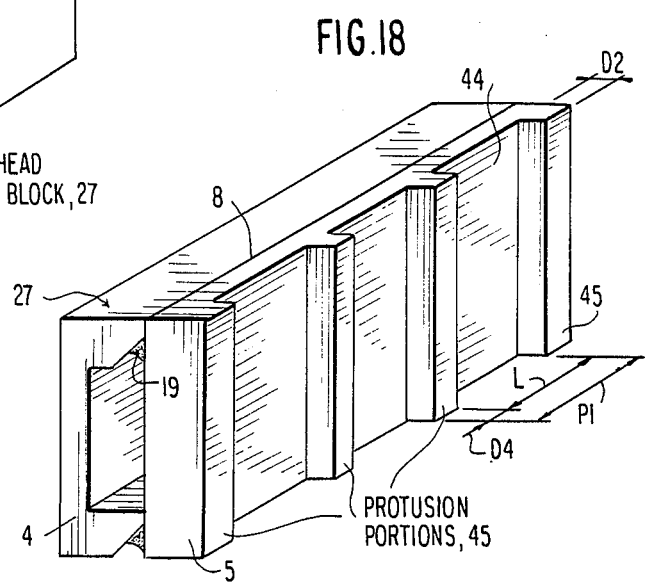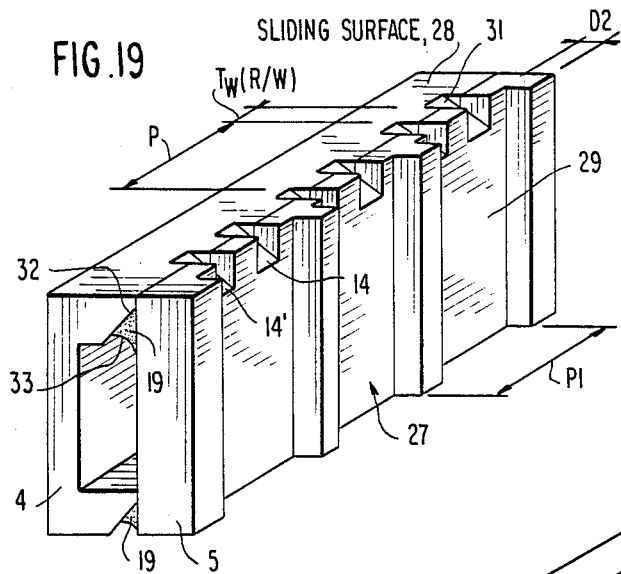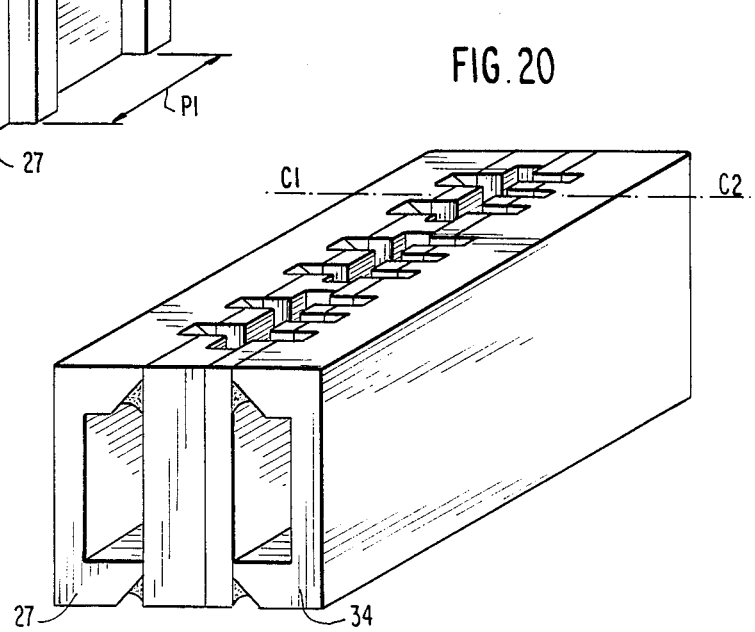

PROCESS FOR MANUFACTURING A COMPOSITE MAGNETIC HEAD STRUCTURE

This is a division of application Ser. No. 824,324 filed 1/30/86, abandoned.

BACKGROUND OF THE INVENTION

This invention relates to a composite magnetic head tip structure for a floppy disc drive apparatus, and to a process for the manufacture thereof.

A conventional composite magnetic head of this kind is shown in FIG. 1, as disclosed in U.S. Pat. No. 4,423,550 and in Japanese Patent Application Publication Nos. 58-182124 and 58-189817.

FIG. 1 shows a composite head tip 1 comprising read-write (R/W) core 2, erase (E) core 3, and molded glass portion 12 which magnetically separates the R/W core and the E core from each other, mechanically joins them, and has a width T of 100 μm. The R/W core comprises an L-shaped side core 4 of ferrite, a center core 5 of ferrite, narrow molded glass portions 10 for controlling or regulating the track width TW on the magnetic medium (not shown), and a gap 8 defined by a non-magnetic layer having a thickness of 1 to 2 μm and composed of a glass layer or a silicon dioxide ($SiO_2$) sputtered layer. The cores 4 and 5 and the gap 8 cooperate to form a R/W head.

The E core 3 is provided with two tracks defined by gaps 9 and narrow molded glass portions 11 which perform tunnel erasure. The width of the central molded glass portion between the two erase tracks is approximately equal to the width TW of the R/W core.

The process for manufacturing this conventional head is explained below with reference to FIGS. 2-7.

FIG. 2 shows the step where the narrow portions 10 which control the track width of the center core 5 are formed. Ferrite blocks 15 are adhered to a holder 13 at an oblique angle α (about 10 to 20 degrees). Narrow notches 14 and 14' are formed using diamond bits, and spaced from each other with a predetermined pitch P to obtain the desired track width TW. Glass portions 10 are then molded into the notches 14 and 14' in a high temperature nitrogen furnace, any residual glass is removed as shown in FIG. 3, and the gap facing surface 16 is polished. A non-magnetic gap spacer (not shown) corresponding to the desired gap width is then formed on the surface 16 by sputtering or the like.

The thus formed center core 5 is mated as shown in FIG. 4 with a U-shaped side core 4 prepared in a similar manner, and each track width portion is then precisely aligned and adjusted. Glass welding is performed at edge notches 17 and 18 using glass 19 with a low melting point or the same kind of glass as in the glass portions 10, which mechanically integrates the side and center cores 4 and 5 together.

FIG. 5 shows an E core block 21 formed by a process similar to the process for manufacturing the R/W core block 20. The same pitch P is used as in the R/W core block 20, and the interval D between the two erase tracks is generally equal to the R/W track width TW.

In FIG. 6, the R/W core block 20 is positioned over the E core block 21 at a desired spacing interval $D_2$ by means of a spacer member (not shown). The center line $C_1$ of the R/W track is then precisely aligned with the center line $C_2$ of the two E tracks, whereafter glass is molded into the space between the two core blocks 20 and 21 to form the molded glass portion 12.

The head tip 23 shown in FIG. 7 is obtained by slicing the joined core blocks 20 and 21 along the dotted lines 22 in FIG. 6, and planing down the sides. A further cut or slice along the dotted line 24 in FIG. 7 provides the bulk type of composite head tip 1 shown in FIG. 1.

At the steps of glass welding shown in FIGS. 4, 5 and 6, that is at three separate steps, precise track alignments must be made, which increases the likelihood of track deviations in the final head tips. Moreover, as the R/W gap is separated by 0.4–0.7 mm from the erase gap, the mutual positional control or regulation between the R/W track and the E tracks is very difficult to perform.

At least ten machining steps and four glass molding steps are involved, which complicates the process, reduces productivity and increases cost.

SUMMARY OF THE INVENTION

The composite type of head tip of the present invention has a read-write track and erase tracks which are formed and aligned with great accuracy. Also, the present invention is a process for manufacturing a composite type of head tip which greatly increases the productivity of the process of the prior art.

The head tip of the present invention comprises a pair of center cores and a pair of corresponding side cores. Each center core and corresponding side core cooperately form a magnetic gap and an apex portion. Each center core and corresponding side core are glass welded together at the apex portion to form a head core. The width of the magnetic gap on each head core is defined by two narrow notches which contain molded glass and which extend from a surface of the center core which faces the other center core, across the magnetic gap, and onto a sliding surface of the side core for slidably contacting with a magnetic medium. The notches end at a point which is directly above the glass welded portion at the apex portion.

The improved process for manufacturing the improved head tip comprises the following steps. A step of glass welding a first center core to a first side core at a first apex portion formed by the first center core and first side core, which together form a first core block with a magnetic gap between the first center and side cores. A second core block is similarly formed. Both core blocks have a sliding surface which is slidable on the surface of a magnetic medium, and a confronting surface which faces the other confronting surface on the other core block.

The next step is forming notches in the first core block while the block is maintained at an oblique angle such that each notch is inclined at the oblique angle. Each pair of notches is separated by a distance of a desired gap width. Each notch is formed such that the notch stretches from one of the confronting surfaces of one of the head core blocks, across the magnetic gap of the core block on which the notch is formed, and to the sliding surface of the core block. Each notch ends at a point on the sliding surface which is directly above any point in the glass welded portion at the apex portion. Similar notches are formed in the second core block.

The two core blocks are then positioned and held by means of spacers at a desired distance so that a space between the two center cores may be formed. Then the first and second sets of notches are aligned. A glass rod containing glass with a melting point lower than that of the glass used for the welded glass portions is then melted into the notches and the space between the two core blocks. Any residue is cleared off of the blocks.

The blocks are then cut to produce the composite type of head tip of the present invention.

The process may also be performed by forming the first and second core blocks as above, with the following modifications. The first center core is made with a thickness equal to the final desired thickness of the first center core plus the desired final thickness of the melted glass portion between the two core blocks. Then vertical grooves or channels, with a depth equal to the desired final thickness of the melted glass portion between the core blocks, are formed in the first core block. Protruding portions of the first core block have a height equal to the desired final thickness of the melted glass portion. Next, the notches are formed in each core block and aligned similarly to as before, and the blocks are joined similar to as before, except that the separate spacers need not be provided because the protruding portions of the first core block act as integral spacers. The union of the two blocks is then turned upside down. Glass rods, each containing glass with a melting temperature substantially the same as the melting temperature of the glass used in the welded glass portions, are melted into and through the apex portions, the notches, and the gaps. The melted glass also fills the spaces between the core blocks by capillary action. Again, the residue is cleared and the blocks are cut to form the composite type head tip of the present invention.

BRIEF DESCRIPTION OF THE DRAWINGS

FIG. 1 is a perspective view showing the structure of a conventional composite type of head tip applicable to a floppy disc drive apparatus;

FIG. 2 to FIG. 7 are perspective views each showing a different respective step in a process for manufacturing the head tip shown in FIG. 1;

FIG. 8 is a perspective view showing a first embodiment of a composite type head tip of this invention;

FIG. 9 to FIG. 15 are figures each showing a different respective step in a process for manufacturing the head tip shown in FIG. 8, where FIGS. 9-11, 14 and 15 are perspective views and FIGS. 12-13 are side views;

FIG. 17 to FIG. 23 are figures each showing a different respective step in a process for manufacturing the head tip shown in FIG. 16, where FIGS. 17-20 and 23 are perspective views and FIGS. 21 and 22 are side views.

DETAILED DESCRIPTION OF THE PREFERRED EMBODIMENTS

Figure 12:
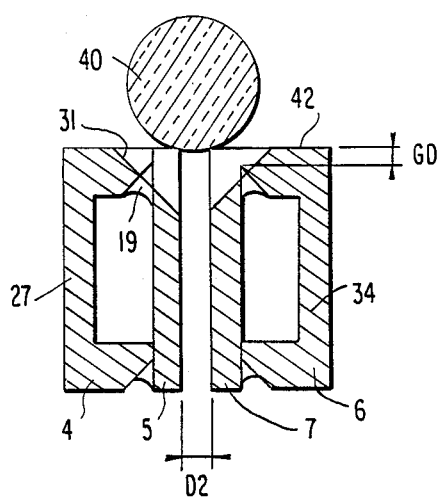

In FIG. 8, there is shown a head tip 25 according to an embodiment of this invention. The head tip 25 comprises a head core 2 which is a read-write (R/W) core in this embodiment, a head core 3 which is an erase (E) core in this embodiment, and a molded glass portion 26 which mechanically joins the R/W core 2 to the E core 3 and fills narrowly formed track notches.

The R/W core 2 includes an L-shaped side core 4 and a center core 5. On a surface of the center core 5 that is for slidably contacting a magnetic medium (not shown), narrow track notches are formed which define a track width TW.

R/W magnetic gap 8 is composed of a non-magnetic layer such as a glass layer or silicon dioxide sputtered layer with a thickness of 1 to 2 μm.

The E core 3 is provided with two erase tracks which are defined by narrow track notches in order to perform so called tunnel erasure. A notch is provided between the two tracks with a width that is nearly equal to the track width TW of the R/W core 2.

The E core 3 further includes an L-shaped side core 6, a center core 7, an erase gap 9 and a glass welded portion 19.

The L-shaped R/W side core 4, the R/W center core 5, the L-shaped erasure side core 6 and the erasure center core 7 are all composed of ferromagnetic material such as ferrite. Also in this embodiment, an alloyed material such as Sendust in combination with a glass material or a brazing material with an expansion coefficient equal to that of the alloyed material can be used for the head cores 2 and 3.

The process for manufacturing the head tip 25 shown in FIG. 8 is described as follows.

In FIG. 9, as in all of the remaining figures, like reference numerals designate elements that correspond with like elements from prior figures. Thus, in FIG. 9, 8 designates what will correspond to the R/W gaps, and 19 designates a glass welded portion. Also in FIG. 9, 27 designates a R/W head core block which is obtained by welding, as explained below.

An abutting surface where the gap of L-shaped R/W core 4 and that of R/W center core 5 meet each other is polished to make the abutting surface extremely fine like a mirror surface. Then, a gap spacer (not shown) of non-magnetic material such as silicon dioxide ($SiO_2$) is formed on the polished abutting surface by sputtering or the like. The thickness of the gap spacer corresponds to the width of the R/W gap. Next, the L-shaped core 4 is faced with the center core 5 in a high-pressure atmosphere, and the two cores 4 and 5 are glass welded together at apex portion 17 and junction portion 18 using glass with a high melting point. Consequently, the block 27 shown in FIG. 9 is obtained.

FIG. 10 shows a step where the narrow track notches 14 and 14' for defining the track width TW are formed in the R/W block 27. Reference number 13' designates a material holder to which one or more of the blocks 27 for R/W are adhered at an oblique angle β (about 10-60 degrees). At this adhering step, the oblique angle β is selected so that an edge 30, defined by a sliding surface 28 which faces the medium (not shown), and a confronting surface 29 which will face the E core 3, has the highest position.

After the adhering step, narrow track notches 14 and 14' are cut in the block 27 so that each pair of notches 14 and 14' defines a desirable track width TW with a predetermined pitch P, and so that the bottom surface of each of the notches 14 and 14' lies deeper than the apex 32 but not as deep as the bottom surface 33 of the welded glass portion 19. More specifically, the notches 14 and 14' start at the confronting surface 29, cross over what corresponds to the magnetic gap portion designated by numeral 8, and end at a point on the sliding surface 28 that is directly above the welded portion 19 of the apex portion 32.

This geometrical configuration of the notches 14 and 14' prevents the molded glass with a low melting point from flowing into the inside portion of the core during a glass molding step performed after this cutting treatment. Namely, in a case where any of the notches 14 and 14' are formed deeper than the bottom surface of the welded glass 19 in apex portion 32, an undesirable hole will exist in bottom surface 31 of those narrow track notches 14 and 14'. Consequently, at the welding step, glass for welding will flow through the hole.

While the notches 14 and 14' are shown formed with a planar bottom surface, a U-shape or V-shape cross-section could be employed.

After this adhering and cutting step, as shown in FIG. 11, a surface of the welded R/W block 27 is confronted with a surface of the welded erasure block 34 which is formed by a similar process to that by which the block 27 is formed. At least two spacers 35, each of which is provided at edge portions of the blocks 27 and 34, are sandwiches between the blocks 27 and 34 to maintain the desired distance $D_2$ between the R/W center core 5 and the erasure center core 7. Then, the blocks 27 and 34 are temporarily joined by putting organic adhering material, for example, between the confronting surfaces.

At this point, the center line $C_1$ of the R/W track is aligned with the center line $C_2$ of the two E tracks. That is, a mutual positional alignment between the R/W track and the E track is performed.

In the next step, as shown in FIG. 12, which is a cross sectional view, a glass rod 40 with a low melting point is disposed on the top portion of an opening with width $D_2$ formed by the confronting surfaces 29 of the center core 5 and the center core 7. The welded R/W block 27 and the welded erasure block 34 are held together in the desired mutual positional alignment by applying and maintaining sufficient pressure.

Figure 13:
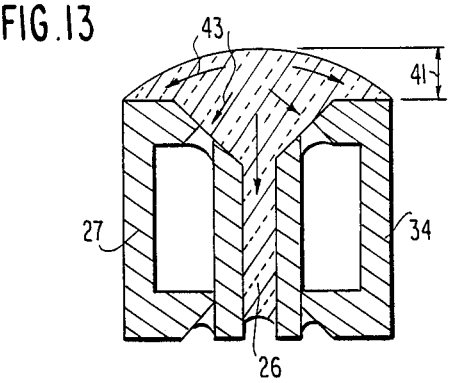

Then, as shown in FIG. 13, which is also a cross sectional view, the blocks 27 and 34 thus formed and the rod 40 are all heated and kept sufficiently hot so as to melt the glass rod 40 thereby applying glass molding to the narrow track notches 14 and 14' and to the opening between the welded R/W block 27 and the welded erasure block 34. As a result, molded glass portion 26 is formed in the space between the two blocks 27 and 34 due to so called capillary action.

At this step, glass for the molded glass portion 26 with a melting point lower than that of the welded glass 19 is selected to prevent the gap 8 from opening and track deviations from forming during this molding treatment. After this step, residual glass portion 41, shown in FIG. 13, is removed by a cutting or polishing treatment.

Figure 14:
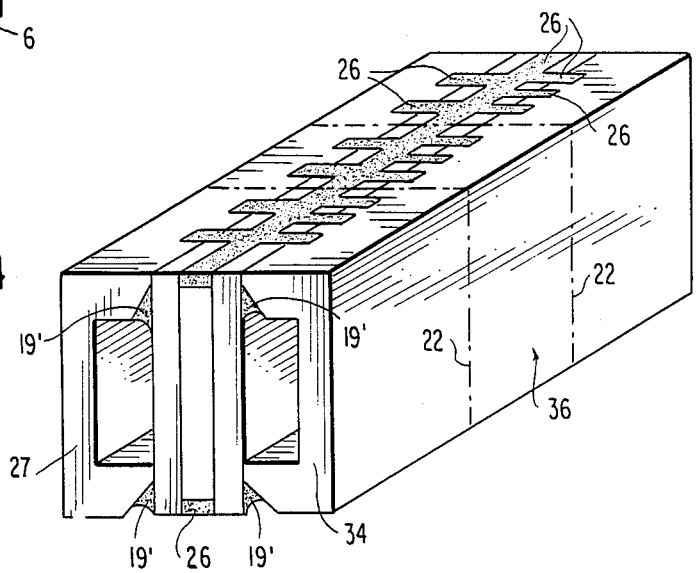
Figure 15:
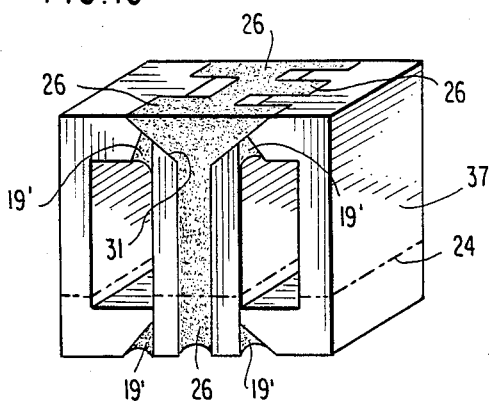

In the next step, a core block assembly 36 for R/W and erasure is formed, as shown in FIG. 14. The assembly 36 is sliced with a cutter of appropriate depth along dotted lines 22 to obtain a head tip 37, as shown in FIG. 15. In a final step, the head tip 37 is sliced along a dotted line 24, as shown in FIG. 15, to obtain the composite type of head tip 25 shown in FIG. 8.

There are several advantages of the above mentioned embodiment. First, manufacturing errors in the track are almost completely eliminated because, after gap welding is performed at the first step shown in FIG. 9, the narrow track notches are cut at the same time in both the center core 5 and the L-shaped core 4, with the cores 4 and 5 fixedly integrated, as shown in FIG. 10.

Second, the mutual positional alignment between the R/W track and the E track may be controlled with high precision since it is possible to employ a high power microscope for aligning the notches. Such a microscope may be employed because each narrow track notch has straight edges or sides, unlike the notches 10 and 11 with rounded edges as shown in FIG. 1. Consequently, it is only necessary to control the mutual positional relation between tracks which are separated from each other by the width $D_2$ (about 0.1 mm) of the space formed between the two core blocks 27 and 34.

Third, the time needed to form the narrow track notches 14 and 14', as shown in FIG. 10, is greatly reduced because the block 27 need only be moved a distance of L2 (about 3-4 mm) in order to form the narrow track notches 14 and 14' for each of the successive blocks 27. This means that the distance that the work is moved is reduced to a third or a quarter of that in a conventional process for manufacturing the head. In other words, the productivity of this step of forming the narrow track notches in this embodiment can be expected to increase to three or four times that of the conventional process.

Fourth, according to the above embodiment, only one glass molding step, as shown in FIG. 12, is needed to accomplish what the above conventional process for manufacturing took five glass molding steps to accomplish, namely, filling four narrow track notch portions and the one space separating the R/W core from the E core. This means that the productivity of the glass molding step in the present embodiment is five times greater than that in the conventional process. Moreover, in the present embodiment, the glass molding applied to the space between the R/W core and the E core flows easily into the space and rarely bubbles, as the bottom surfaces 31 of the narrow track notch portions in the R/W core and the E core face each other and form a funnel-like shape since the notches decline toward the space at an angle $\beta$, as shown in FIG. 10.

Figure 16:
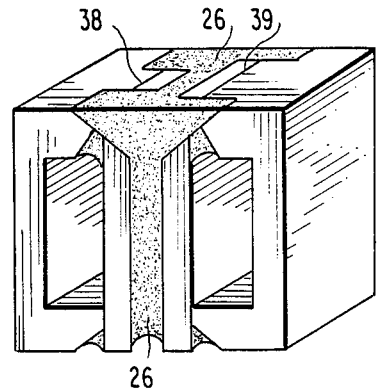
FIG. 16 is a perspective view showing a second embodiment of a composite type of head tip of this invention.

The concept of the above embodiment is applicable to a so called R/W independent manner type of head, as shown in FIG. 16, although the head in the above embodiment is a so called tunnel type of bulk head in which an erase core has two erase tracks for erasing the information on both sides of the read-write track. The concept of the above embodiment is also applicable to a head for a floppy disc drive apparatus as well as a composite type of head such as a read after write type of head, which has plural cores and is utilized in other than a floppy disc drive apparatus.

A second embodiment of the process for manufacturing a head tip according to this invention is described below. This second embodiment is preferable to the above-mentioned first embodiment.

As shown in FIG. 17, the shape of the R/W head core block 27 is similar to that in FIG. 9, however, the welded glass portion 19 uses a first glass with a low melting point. Also, the center core 5 has a thickness D5 which is selected to be the sum of a desired thickness of the center core 5 of the finished head tip 1 and a distance D2 between the R/W core 2 and the E core 3, as shown in FIGS. 1 and 17-20.

As shown in FIG. 18, at a portion of the R/W center core 5 which will face the E core 3, channels 44 are formed by channel working. The channels 44 have a depth which corresponds to the distance D2 between the R/W core 2 and the E core 3. Protrusion portions 45 are formed at equal intervals and have a height D2 equal to the desired distance D2 between the R/W core 2 and the E core 3, so that the finished head tip 1 will have the same distance D2 between the R/W core 2 and the E core 3, and the thickness of the melted glass portion to be provided between the two cores 2 and 3 will also be the same distance D2.

Each of the channels 44 has a width L which is a little larger than the width of the finished head tip 1. The pitch P between any two adjacent channels is selected according to the following equation:

$$P1 = N \times P \quad [N = \text{integer}],$$

where P1 is the pitch between adjacent protrusions 45. Therefore, FIG. 18 corresponds to the case where N=1, so that P1=P in the above equation.

Referring to FIG. 19, the narrow track notches 14 and 14' which define the track width TW are formed as described below. First, the narrow track notches 14 and 14' are formed by cutting into the welded block 27 with a diamond blade or the like, so that each strip of the magnetic gap 8 that corresponds to a desirable track width will be at a predetermined interval equal to the pitch P which equals P1 in this case. The respective track notches 14 and 14' are further formed so as to bridge the surface 29 facing the E core and the sliding surface 28. In other words, the notches 14 and 14' start at the surface 29 facing the E core, and the notches 14 and 14' cross over the magnetic gap 8 and end on the sliding surface 28, at a portion of the sliding surface 28 that is directly above a part of the welded portion 19.

It is necessary that the bottom surface 31 of each of the notches 14 and 14' be located deeper than the apex portion 32, so that holes are formed where the bottom surfaces 31 of the track notches 14 and 14' meet the glass welded portion 19. However, unlike in the above-mentioned first embodiment, the bottom surface 31 of the notches can even be cut deeper than the surface 33 of the welded glass portion 19, because in this second embodiment, it is not necessary to prevent the molded glass from flowing through the welded portion 19 and out of the notches. In other words, in this second embodiment it is irrelevant whether or not the bottom surface 31 of a notch 14 or 14' is located deeper than the bottom surface 33 of the welded glass portion 19.

The E core block 34 is formed in a manner which is similar to the way in which the R/W core block 27 is formed, and a second glass material which is used for the glass welded portion of the E core block 34 has a melting point which is substantially equal to that of the first glass material used in the R/W core block 27.

As shown in FIG. 20, after aligning the R/W tracks with the E tracks, the two blocks 27 and 34 are temporarily binded at the protruded portions 45 of the block 27 and the corresponding portions of the block 34 by applying an organic binder.

Figure 21:
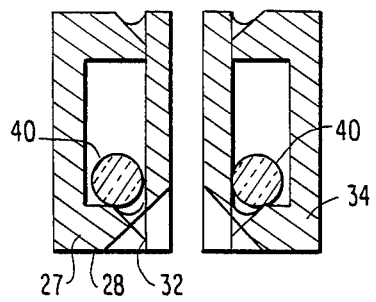

After the two blocks 27 and 34 have been temporarily joined, the blocks 27 and 34 are turned upside down so that the sliding surface 28 faces downward, as shown in FIG. 21. The positional alignment of the R/W gap and the E gaps is maintained by applying uniform pressure to the blocks 27 and 34 as in the first embodiment. A third glass material or glass rods 40 for molding are then placed above the top portion of the apex portions 32 of the R/W core block 27 and the E core block 34, respectively. The third glass material in the glass rod 40 has a melting point substantially as low as the melting points of the first and the second glass materials.

Figure 22:
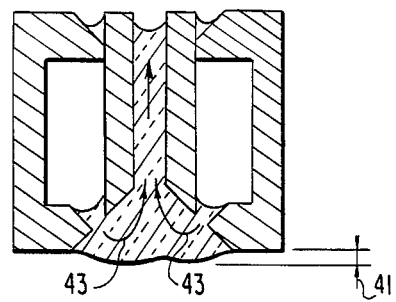

Next, as shown in FIG. 22, the blocks 27 and 34 are placed in a high temperature atmosphere, so that the glass rods 40 melt whereby glass molding is performed. Since the melting temperature of the first and second glass materials used in the welded glass portion 19 is approximately the same as the melting temperature of the third glass used in the glass rods 40, the melted glass flows downward through the glass welded portion 19 and through the holes where the bottom surfaces 31 of the track notches 14 and 14' meet the glass welded portion 19. Then the molten glass enters the narrow track notches 14 and 14', and goes upward filling the space between the R/W core block 27 and the E core block 34 due to capillary action.

In this embodiment, the height 41 of the molded glass protruding from the level, sliding surface 28 can be suppressed to a value of about 30 to 50 $\mu$m. Any residual glass can be removed in a short time, because all of the sliding surface 28 is not covered with molded glass.

Figure 23:
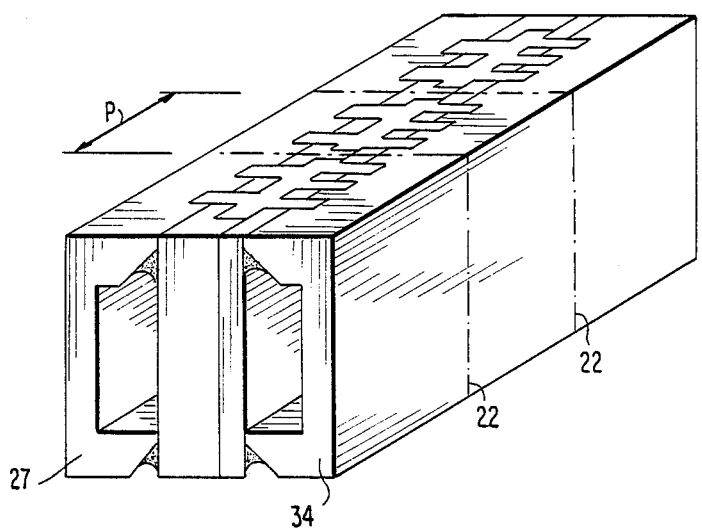

After this step, as shown in FIG. 23, the mechanically integrated combination of the blocks 27 and 34 is sliced along each dotted line 22 with an interval equal to the pitch P. Slicing is accomplished by using a cutter with a width suitable to obtain a head tip similar to that shown in FIG. 15. The width D4 of the protrusion portions 45 is selected such that D4 is less than the pitch P between each set of notches minus the depth of the finished head tip. Thus, the protrusion portions 45 may be sliced off to obtain the finished head tip similar to that shown in FIG. 15.

After this step, a composite type of head tip, as shown in FIG. 15, which is similar to that shown in FIG. 8, can be obtained by slicing the head tip formed in the previous step along the dotted line 24 in the same way as in the first embodiment.

In the above-described second embodiment, the channels 44, the depth of which corresponds to the distance between the R/W core block 27 and the E core block 34, and the protrusion portions 45 with heights equal to the distance between the two head core blocks 27 and 34, are preferably formed such that the protrusion portions 45 with width D4 remain at uniform intervals equal to the pitch P1.

If the step-like protrusion portions 45 were provided only at both edge portions of the block 27 (that is, only two protrusion portions 45 would exist, each at an edge portion), then the pressure applied to the portion of the L-shaped core 4 and the center core 5 between the edge portions of the block 27 is negligible. Therefore, during the glass remelting and molding, the magnetic gap portion 8 would expand wider than the gap portion 8 is at the step for glass molding shown in FIG. 22 where the protrusion portions 45 are provided between the two edges as well as at the two edges.

In the above-mentioned second embodiment, the protrusion portions 45 provided with the pitch P1 at uniform intervals prevent the gap portion 8 from widening because at the joint surface 26 between the R/W core block 27 and the E core block 34 as shown in FIG. 20, pressure is applied to the blocks 27 and 34 at a uniform pitch even in the step during which the welded glass 19 is remelted. The expansion of the gap 8 can be extremely reduced where the pitch for the track notches is 0.5 to 1 mm, if the pitch P1 for the protrusion portions 45 is five times the pitch P for the track notches.

The channels 44 could be provided in the E center core 7 or in both the R/W center core 5 and the E center core 7. In the above-described second embodiment, the channels 44 have been provided in the R/W center core 5 so that the height of the protrusion portions 45 may be selected to be equal to the distance between the R/W core block 27 and the E core block 34.

Since the glass with a low melting point which is lower than 800° C. is utilized as the first, the second, and the third glass materials, the above second embodiment has the following advantages.

The cost of a furnace for welding the glass is reduced and the erosion of the ferrite caused by using glass with a high melting point is reduced by using glass with substantially similar melting points, unlike in the embodiment shown in FIGS. 9, 12 and 13, where glass 19 with a high melting point is used for welding the apex portion 32 under an operating temperature ranging from 800° to 900° C. and where the molded glass portion 26 (at the narrow track notches 14 and 14' and the space between the R/W core block 27 and the E core block 34) is formed with glass with a melting point lower than the operating temperature of the glass 19. That is, the embodiment shown in FIGS. 9, 12, and 13 requires using a furnace with two operating temperatures, one for glass welding, and one for glass molding, while the second embodiment requires using a furnace with only one operating temperature.

A high precision composite type of head tip can be produced using the manufacturing procedure of the second embodiment, and the operating time in the step for removing the residual glass is reduced because residual glass is almost prevented from flowing onto the sliding surface 28. Therefore, residual glass may be quickly and thoroughly removed from the sliding surface 28.

In the embodiment shown in FIGS. 12-13, the gap portion is formed in such a way as a depth GD, measured from a surface facing the magnetic medium, i.e. reference surface 42, is selected to be a prescribed value ranging from 100 to 200 μm. When the narrow track notch portion and the space between the R/W core block 27 and the E core block 34 are being filled with molten glass, the glass flows along the arrows 43 as shown in FIG. 13 to form the residual glass portion 41 covering the reference surface 42. The height of the residual glass portion 41 is as large as 300 to 600 μm depending on the viscosity of the glass. With such a height of residual glass, it takes a lot of time to remove the residual glass portion 41. Moreover, in removing that much residual glass, portions of the reference surface 42 will undoubtedly be removed, thereby increasing the dimensional error in forming the gap portion with thickness GD. However, as explained previously, in the second embodiment, these disadvantages do not exist.

We claim:

1. A process for forming a composite magnetic head structure, comprising the steps of:
    fixing a first center core (5) to a first side core (4) to form a first head core block (27) having a first sliding surface (28) for slidably contacting a record medium, said first sliding surface having a first magnetic gap (8) between said first center and side cores;
    fixing a second center core (7) to a second side core (6) to form a second head core block (34) having a second sliding surface for slidably contacting said record medium, said second sliding surface having a second magnetic gap (9) between said second center and side cores;
    forming at least one first notch (14, 14') in said first head core block for controlling the width (TW) of said first magnetic gap at said first sliding surface;
    forming at least one second notch in said second head core block for controlling the width (TW) of said second magnetic gap at said second sliding surface; and
    fixing said first and second head core blocks to one another with said first and second center cores facing one another and said first and second magnetic gaps substantially parallel to one another to form said composite magnetic head structure,
    wherein said first notch extends from said first sliding surface to an adjacent surface (29) of said first center core and crosses said first magnetic gap, and said second notch extends from said second sliding surface to an adjacent surface of said second center core and crosses said second magnetic gap,
    wherein said first center and side cores meet to form a first apex portion (19) behind said first sliding surface, and said first notch passes through said apex portion, and wherein said second center and side cores meet to form a second apex portion behind said second sliding surface, and said second notch passes through said second apex portion,
    wherein said step of fixing said first and second head core blocks to one another comprises:
    orienting said first and second head core blocks with said adjacent surfaces facing one another and separated by a desired distance, and with said first and second sliding surfaces aligned with one another and facing downwardly, disposing a welding material (40) in at least one of said first and second apex portions; and heating said welding material above its melting point whereby said welding material flows downward through said notches in said first and second sliding surfaces and upward by capillary action into the space between said adjacent surfaces.

2. A process for forming a composite magnetic head structure according to claim 1, wherein said steps of fixing said first center core to said first side core and fixing said second center core to said second side core comprise providing a welding material in said apex portions to form first and second welded portions (19), and wherein said steps of forming said notches comprise cutting said notches through said welded portions.

3. A process for forming a composite magnetic head structure according to claim 1, wherein at least one of said adjacent surfaces of said first and second center cores has protruding portions (45) with a distance of protrusion equal to said desired distance (D2), whereby said protruding portions act as spacers between said first and second head core blocks during said step of fixing said first and second head core blocks to one another.

4. A process for forming a composite magnetic head structure according to claim 3, wherein said protruding portions are formed at uniform intervals.

5. A process for forming a composite magnetic head structure according to claim 3, wherein there are a plurality of pairs of first notches in said first head core blocks, with each pair controlling the width of a respective one of a plurality of said first magnetic gaps, and the distance (P1) between said protruding portions is an integral multiple of the distance (P) between the centers of adjacent ones of said first magnetic gaps.

6. A process for forming a composite magnetic head structure, comprising the steps of:
    fixing a first center core (5) to a first side core (4) to form a first head core block (27) having a first sliding surface (28) for slidably contacting a record medium, said first sliding surface having a first magnetic gap (8) between said first center and side cores;

fixing a second center core (7) to a second side core (6) to form a second head core block (34) having a second sliding surface for slidably contacting said record medium, said second sliding surface having a second magnetic gap (9) between said second center and side cores;

forming at least one first notch (14, 14') in said first head core block for controlling the width (TW) of said first magnetic gap at said first sliding surface;

forming at least one second notch in said second head core block for controlling the width (TW) of said second magnetic gap at said second sliding surface; and fixing said first and second head core blocks to one another with said first and second center cores facing one another and said first and second magnetic gaps substantially parallel to one another to form said composite magnetic head structure, wherein said first notch extends from said first sliding surface to an adjacent surface (29) of said first center core and crosses said first magnetic gap, and said second notch extends from said second sliding surface to an adjacent surface of said second center core and crosses said second magnetic gap, wherein said first center and side cores meet to form a first apex portion (19) behind said first sliding surface, and said first notch passes through said apex portion, and wherein said second center and side cores meet to form a second apex portion behind said second sliding surface, and said second notch passes through said second apex portion, and wherein said step of fixing said first center core to said first side core comprises welding said first apex portion with a first glass material to form a first welded glass portion, said step of fixing said second center core to said second side core comprises welding said second apex portion with a second glass material to form a second welded glass portion, and said step of fixing said first and second head core blocks to one another comprises welding said first and second center cores to one another with a third glass material to form a third welded glass portion by simultaneously molding said first and second welded glass portions and said third glass material so that said first and second welded portions are integrally molded with one another and with said third welded glass portion.

7. A process for forming a composite magnetic head structure according to claim 6, wherein the melting points of said first, second and third glass materials are substantially the same.

* * * * *